United States Patent
Alperine et al.

(10) Patent No.: US 6,333,118 B1
(45) Date of Patent: Dec. 25, 2001

(54) HEAT BARRIER COMPOSITION, A MECHANICAL SUPERALLOY ARTICLE PROVIDED WITH A CERAMIC COATING HAVING SUCH A COMPOSITION, AND A METHOD OF MAKING THE CERAMIC COATING

(75) Inventors: Serge Alperine; Véronique Arnault; Odile Lavigne, all of Paris; Rémy Mevrel, Le Plessis Robinson, all of (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/659,818

(22) Filed: Sep. 11, 2000

(30) Foreign Application Priority Data

Sep. 16, 1999 (FR) .................................................. 99 11565

(51) Int. Cl.$^7$ ................................ B32B 9/00; B05D 1/36; B05D 7/00
(52) U.S. Cl. .......................... 428/469; 428/472; 428/697; 428/701; 428/702; 428/632; 428/633; 427/419.1; 427/419.2
(58) Field of Search ..................... 428/621, 622, 428/623, 632, 633, 469, 472, 697, 699, 702; 427/453, 419.1, 419.2, 419.3

(56) References Cited

U.S. PATENT DOCUMENTS

| 3,525,597 | 8/1970 | Mazdiyasni et al. . | |
|---|---|---|---|
| 6,025,078 | * 2/2000 | Rickerby et al. | ..................... 428/469 |

FOREIGN PATENT DOCUMENTS

| 0 354 573 | 2/1990 | (EP) . |
| 0 812 931 A1 | 12/1997 | (EP) . |
| 0 825 271 A1 | 2/1998 | (EP) . |

* cited by examiner

*Primary Examiner*—Deborah Jones
*Assistant Examiner*—Jason Vincent V. de la Peña
(74) *Attorney, Agent, or Firm*—Oblon, Spivak, McClelland, Maier & Neustadt, P.C.

(57) ABSTRACT

A low thermal conductivity heat barrier composition, particularly for a superalloy article, is disclosed comprising a zirconia base and a dysprosium oxide having the dual function of stabilizing the zirconia and reducing the thermal conductivity thereof. Optionally, the composition also comprises a metal oxide containing a quadrivalent metallic ion selected from the group consisting of hafnium dioxide, cerium dioxide, uranium dioxide, and mixtures thereof.

19 Claims, 2 Drawing Sheets

Fig : 1

HEAT BARRIER COMPOSITION, A MECHANICAL SUPERALLOY ARTICLE PROVIDED WITH A CERAMIC COATING HAVING SUCH A COMPOSITION, AND A METHOD OF MAKING THE CERAMIC COATING

BACKGROUND OF THE INVENTION

1. Field of the Invention

The invention relates to a low thermal conductivity heat barrier composition, a mechanical superalloy article provided with a protective heat barrier ceramic coating having such a composition, and a method of making the ceramic coating.

2. Summary of the Prior Art

For more than 30 years the makers of turbine engines for both land and aeronautical use have been tackling the problems of increasing turbomachine efficiency, reducing their specific fuel consumption, and reducing polluting emissions of the $CO_x$, $SO_x$ and $NO_x$ type as well as unburned components. One way of dealing with these demands is to get close to the combustion stoichiometry of the fuel and thus to increase the temperature of the gases issuing from the combustion chamber and entering the first stages of the turbine.

As a result it has been necessary to make the materials used for turbines compatible with this increase in combustion gas temperatures. One solution adopted has been to improve turbine blade cooling techniques, which has led to a considerable increase in the technical complexity and the cost of production of the blades. Another solution has been to develop the refractory nature of the materials used in terms of peak working temperature, creep and fatigue life. This solution started to be used when superalloys with a nickel and/or cobalt base became available, and underwent a considerable technical advance as a result of the change from equiaxial superalloys to monocrystalline superalloys (giving a creep resistance improvement of 80 to 100° C.). This route can now be exploited further only with substantial development costs, giving third-generation superalloys providing a further gain in creep resistance of approximately 20° C. Beyond this a change in the family of materials is required.

An alternative to changing the family of materials is to deposit a heat-insulating ceramic coating, called a heat barrier, on the superalloy articles. This ceramic coating enables a cooled article to have, during continuous operation, a thermal gradient across the ceramic which is possibly more than 200° C. The working temperature of the metal below is reduced in proportion, with considerable effect on the volume of cooling air required, the working life of the article, and the specific fuel consumption of the engine.

The ceramic coating may be deposited on the article to be coated by various processes, most of which belong to two different categories, namely sprayed coatings and physical vapour phase deposited coatings. Other deposition processes of the plasma assisted chemical vapour phase deposition (CVD) type can also be used.

For sprayed coatings a zirconia based oxide is deposited by a plasma spraying technique. The coating consists of a stack of melted ceramic droplets which are then quenched, flattened and stacked to form an incompletely densified deposit between 50 μm and 1 mm thick. One of the characteristics of this kind of coating is a high intrinsic roughness (the roughness Ra being typically between 5 and 35 μm). The commonest kind of degradation associated with this coating in use is the slow propagation of a crack in the ceramic parallel to the ceramic/metal interface.

The problem is rather different in the case of coatings deposited by physical vapour phase deposition. A deposition of this kind can be made by evaporation under electron bombardment. The main characteristic is that the coating consists of an assembly of very fine columns, typically between 0.2 and 10 μm, which extend substantially perpendicularly to the surface to be coated. The thickness of such a coating can be between 20 and 600 μm. Such an assembly has the useful property of faithfully reproducing the surface texture of the substrate covered. In particular, in the case of turbine blades this enables a final roughness of considerably less than 1 μm to be obtained, which is very advantageous for the aerodynamic properties of the blade. Another consequence of the columnar structure of physical vapour phase ceramic depositions is that the gap between the columns helps the coating to deal very effectively with the compression stresses arising in operation due to the difference between expansion of the superalloy substrate and expansion of the coating. In this case long working lives under thermal fatigue at high-temperature can be achieved, and the coating tends to rupture in the region of the interface between the underlayer and the ceramic.

Chemical vapour phase deposition techniques produce coatings whose morphology is columnar and substantially equivalent to the morphology of physical vapour phase deposits. In both these techniques the formation of oxide results from a molecular reaction between metallic atoms or ions and oxygen.

The heat barrier coatings consist of a mixture of oxides, usually having a zirconia base. This oxide is a useful compromise between a material of fairly low thermal conductivity and a material of relatively high coefficient of expansion near that of the nickel or cobalt based alloys on which it is required to deposit the coating. One of the ceramic compositions which has proved very satisfactory is zirconia completely or partly stabilised by an oxide such as, for example, yttrium oxide: $ZrO_2$+6 to 8 Wt. % of $Y_2O_3$. The yttrium oxide serves to stabilise the cubic allotropic variety C and/or the non-transformable tetragonal variety t' of the zirconia and thus to prevent martensitic phase transitions in response to excursions between ambient temperature and the high working temperature of the article.

The main requirement of a heat barrier coating is that it should slow down heat exchanges between an external environment of hot gases and the coated metal article, which is nearly always cooled by a forced flow of cold gases. Heat exchange between the ceramic coating and the metal below it can be by conduction and, to a lesser extent, by radiation. The thermal conductivity of an oxide is of course the sum of a phonic contribution which varies as a function of 1/T and of a radiant contribution which varies as a function of $T^3$. In the case of partly or completely stabilised zirconias it is found that the radiant contribution is substantial beyond 500° C. in a monocrystal (thermal conductivity increases rapidly with temperature) but is negligible up to 1200° C. in a polycrystal since thermal conductivity is found to decrease as temperature rises. This phenomenon is due to retro-diffusion at faults in the polycrystal, such as grain junctions and porosities. In the case of heat barrier coatings which are polycrystalline in nature heat transmission by radiation is less than heat transmission by conduction. Consequently, to improve the heat insulation provided by a heat barrier the key controlling parameter is heat transmission by phonons.

There are several methods for decreasing the thermal conductivity of the coating, based on the fact that heat barrier coatings are porous ceramic layers and the thermal conductivity of the coating is that of a heterogeneous assembly of two heat-conducting media, namely the ceramic material itself of intrinsic conductivity $\lambda_{intr}$, and the pores or microcracks of the coating whose conductivity is close to that of the gas filling them under operating conditions.

The effective conductivity $\lambda_{actual}$ of the coating is between $\lambda_{intr}$ and the conductivity of air $\lambda_{air}$. It can in fact be stated that $\lambda_{actual}$ is a complex function of $\lambda_{intr}$ and $\lambda_{air}$ and the morphology of the coating.

A first solution to the problem of obtaining a low thermal conductivity coating is to use a ceramic of conventional ceramic composition, such as zirconia partly stabilised by 6 to 8 wt. % of yttrium oxide, and to modify the morphology of the coating—i.e., the proporation, distribution and orientation of the pores and microcracks of the coating, or the arrangement of the material in the form of columns or strata—so as to reduce $\lambda_{actual}$. This result can be achieved by modifying the coating deposition parameters.

A second solution is to try to reduce $\lambda_{intr}$ directly by modifying the chemical composition of the coating, without altering its morphology and while conserving the other properties of the coating. For example, it is well known that the introduction of yttrium into zirconia reduces its thermal conductivity by creating gaps in the lattice due to the zirconium ions having a different valency from the yttrium ions. In general the introduction of spot defects into the lattice which act as phonon retrodiffusion centres helps to reduce thermal conductivity, and this is the solution which is used in the present invention.

Published European patent application EP 0,825,271 A1 describes a ceramic coating having a zirconia base and containing two additional oxides, namely:

a first oxide serving to stabilise the tetragonal or cubic form of the zirconia, this oxide possibly being yttrium oxide, calcium oxide, magnesium oxide, indium oxide, scandium oxide, or ytterbium oxide; and, a second oxide serving to reduce phonic thermal conductivity and absorbing radiant energy in the waveband between 0.3 and 5 $\mu$m to reduce heat conductivity due to photons.

In an alternative version the ceramic zirconia-based layer contains three additional oxides, namely:

a first oxide serving to stabilise the tetragonal or cubic form of the zirconia, this oxide possibly being yttrium oxide, calcium oxide, magnesium oxide, indium oxide, scandium oxide, or ytterbium oxide;

a second oxide serving to reduce phonic thermal conductivity; and a third oxide which absorbs the radiant energy in the waveband between 0.3 and 5 $\mu$m to reduce thermal conductivity due to photons.

However, the compositions proposed in this document are complex and expensive.

SUMMARY OF THE INVENTION

It is an object of the invention to provide a novel zirconia-based ceramic composition for achieving a heat barrier coating which is less heat-conductive than the yttriated zirconia conventionally used for heat insulation systems and more particularly for heat barriers.

To this end, the invention provides a low thermal conductivity heat barrier composition composed of a zirconia base and a dysprosium oxide having the dual function of stabilishing the zirconia and reducing the thermal conductivity of the zirconia due to phonons. More particularly the dysprosium oxide serves to stabilise the zirconia and reduce the intrinsic conductivity of the ceramic by the introduction of spot defects in the lattice while preserving its other main characteristics such as, for example, the nature of the phases, the coefficient of expansion, and the refractory properties.

Preferably, the proportion of the dysprosium ion in the composition is between 2 and 30 atomic wt. %.

Optionally, to further reduce the thermal conductivity of the ceramic the zirconia may also contain between 0 and 30 mol. % of an oxide containing a quadrivalent metallic ion of greater mass than the zirconium ion, the quadrivalent metallic ion oxide preferably being hafnium dioxide, cerium dioxide, uranium dioxide, or a mixture of these oxides.

The composition in accordance with the invention is particularly useful for forming a ceramic heat barrier coating on a mechanical superalloy article.

Preferably, the ceramic coating is deposited on a bonding underlayer consisting of an alloy adapted to form a protective alumina layer. This alloy may be, for example, of the MCrAlY type, wherein M is a metal selected from nickel, cobalt, iron, and mixtures of these metals. The alloy may also be a nickel aluminide possibly containing one or more metals selected from chromium and the precious metals such as platinum, palladium, ruthenium, iridium, osmium and rhodium.

The invention also provides a method of making a heat barrier coating on a superalloy substrate comprising the steps of:

depositing a bonding underlayer on the superalloy substrate; and depositing on the underlayer a ceramic coating comprising zirconia, a dysprosium oxide to stabilise the zirconia and reduce the phonic thermal conductivity of the zirconia, and, optionally, from 0 to 30 mol. % of an oxide selected from the group consisting of hafnium dioxide, cerium dioxide, uranium dioxide, and mixtures thereof.

Other preferred features and advantages of the invention will become apparent from the following non-limitative examples and description and with reference to the accompanying drawings.

DETAILED DESCRIPTION OF THE INVENTION AND PREFERRED EXAMPLES

Figure 1:
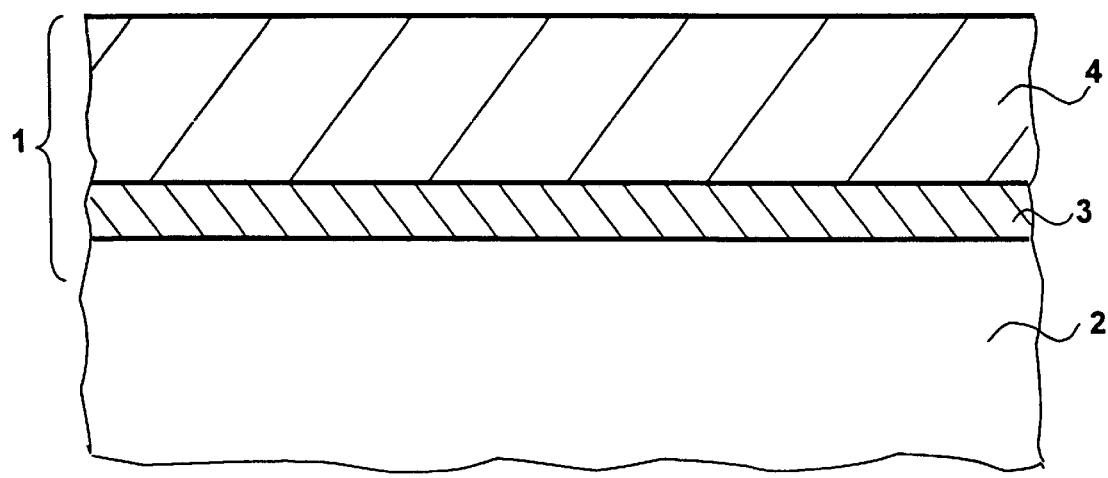
FIG. 1 is a schematic section, to an enlarged scale, showing a mechanical superalloy article comprising a ceramic heat barrier coating formed in accordance with the invention.

The mechanical article shown in FIG. 1 comprises a heat barrier coating 1 deposited on a substrate 2 made of a superalloy such as a nickel and/or cobalt based superalloy. The coating 1 comprises a metallic underlayer 3 deposited on the substrate 2 by a process which is known in the art, and a ceramic layer 4 of novel composition in accordance with the invention deposited on the underlayer 3.

The underlayer 3 may be an oxide-corrosion-resistant alumino-forming alloy of the MCrAlY type (M=Ni and/or Co and/or Fe), or a nickel or cobalt aluminide possibly modified by the addition of chromium and/or one or more precious metals selected from platinum, palladium, ruthenium, iridium, osmium and rhodium.

The ceramic 4 consists of a zirconia base and a dysprosium oxide for stabilising the zirconia and surprisingly having the advantage of reducing the thermal conductivity of the ceramic to a much greater extent than the other conventionally used oxides. To decrease thermal conductivity still further the ceramic may also contain an additional metal oxide comprising a quadrivalent metallic ion having an atomic mass greater than the atomic mass of zirconium ions.

The quadrivalent metallic ion may be cerium, hafnium, or uranium.

EXAMPLE 1

To assess the advantage of using dysprosium oxide in its dual function as a zirconia stabiliser and an oxide appreciably reducing the conductivity of zirconia by reducing the conductivity due to phonons in the material, the following test was made.

Ceramic powders were synthesised with the following three compositions:

1. $ZrO_2 + 4$ mol. % $Y_2O_3$
2. $ZrO_2 + 4$ mol. % $DY_2O_3$
3. $ZrO_2 + 12$ mol. % $DY_2O_3$ These powders were sintered at high temperature without the addition of a sintering agent so as to obtain dense pellets having equivalent residual porosity levels. The thermal conductivity of the pellets was determined by a heat diffusivity measurement using a flash method at ambient temperature. To make this measurement the specimen is irradiated on its front surface by a short heat pulse. The experimental heat diffusivity value can be deduced by recording the temperature developed at the rear surface of the specimen. To assess the conductivity of the completely dense material, called $\lambda_{intr}$, the conductivity value was corrected for the total residual proosity of the pellets. The results are given in the following table:

| Composition | Conductivity in W/m.K |
| --- | --- |
| $ZrO_2 + 4$ mol. % $Y_2O_3$ | 2.8 |
| $ZrO_2 + 4$ mol. % $Dy_2O_3$ | 2.4 |
| $ZrO_3 + 12$ mol. % $Dy_2O_3$ | 1.7 |

These measurements show the advantageous reduction in thermal conductivity achieved by replacing yttrium oxide by dysprosium oxide in accordance with the invention. A nearly 40% reduction in conductivity can be achieved at ambient temperature.

EXAMPLE 2

An article made of Hastelloy X alloy is used as a substrate, and is coated with a MCrAlY type metallic underlayer by a known process. A ceramic coating in accordance with the invention is then electron beam vapour deposited on the underlayer. The composition of the ceramic coating is as follows:

| | |
| --- | --- |
| $ZrO_2$ | base |
| $Dy_2O_3$ | 29.2 wt. % |

After the deposition step the coated article is given a stabilishing heat treatment in vacuo at 1080° C. for 2 hours.

The columnar structure ceramic coating prepared by the process used has a density of 4800 kg/m³ and a thickness of 190 μm. X-ray diffraction examination of the crystallographic structure of the coating shows that it consists entirely of the cubic phase, which remains stable after 100 hours exposure to 1250° C.

The thermal conductivity of the ceramic coating was determined as in Example 1, but at temperatures varying between 20° C. and 1100° C. In this case no correction was made for coating porosity. The thermal conductivity values of this ceramic were compared with those obtained from a conventional ceramic having the composition $ZrO_2+8$ wt. % $Y_2O_3$ and prepared by the same process in order to assess the conductivity reduction provided by the invention. A check was made to ensure that both ceramics had the same microstructure to make sure that the difference between the thermal conductivities of the two materials arise from their different compositions and not from any differences in microstructure.

Figure 2:
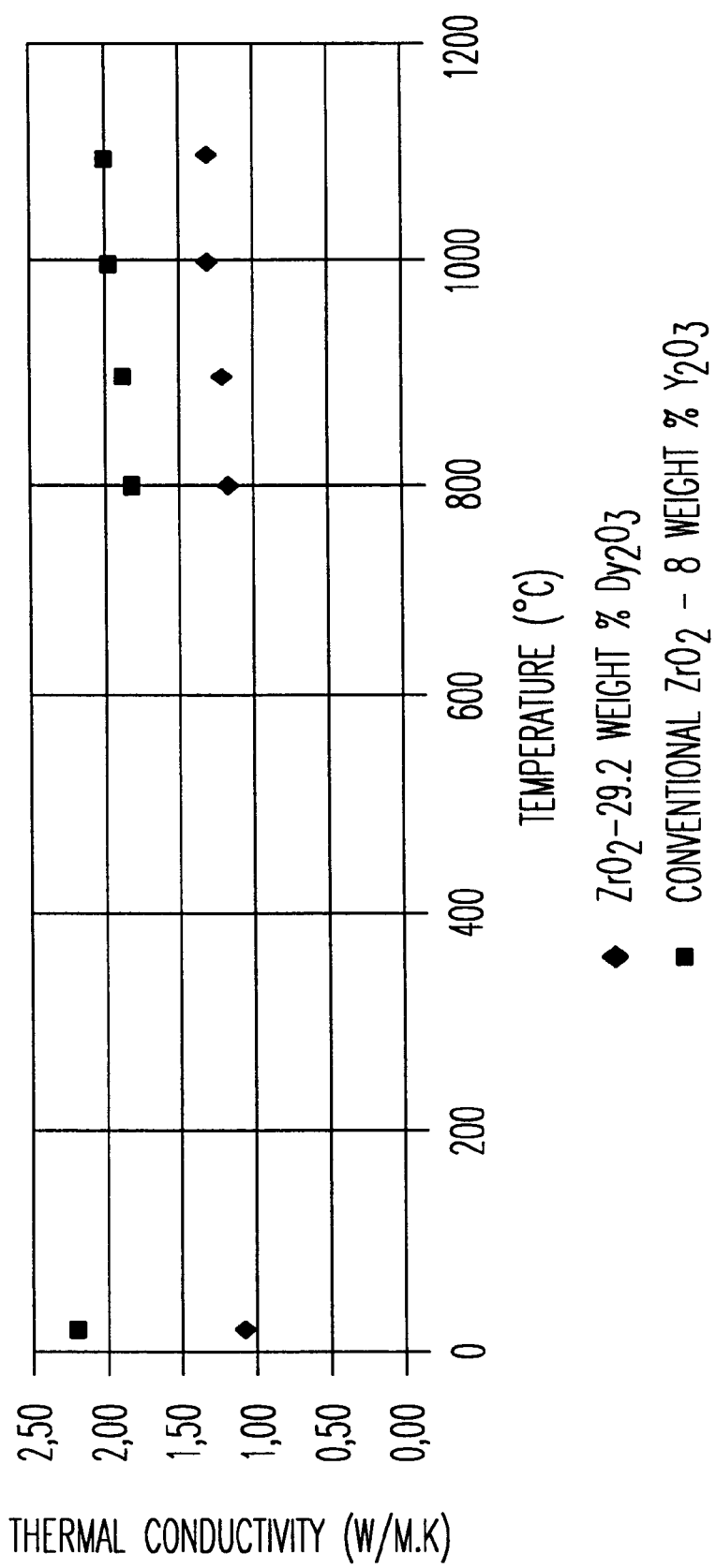
FIG. 2 is a graph showing the comparative values of thermal conductivity obtained at different temperatures for a heat barrier coating formed by a ceramic having a composition in accordance with the invention and for a heat barrier coating formed by a conventional ceramic.

The comparative thermal conductivity values obtained at various temperatures for a coating comprising a ceramic having a composition in accordance with the invention and for a coating comprising a conventional ceramic are shown in FIG. 2. The measured thermal conductivity of the novel ceramic is 1.08 W/m.K at 20° C. whereas the thermal conductivity of the conventional ceramic is 2.19 W/m.K. The novel ceramic therefore halves the thermal conductivity at 20° C.

Similarly, a comparison between the thermal conductivities measured at 1100° C. shows that the novel ceramic can reduce thermal conductivity by a factor of 1.53.

FIG. 2 therefore shows that the thermal conductivity of the novel ceramic is appreciably less than that of the conventional ceramic at all temperatures.

EXAMPLE 3

A ceramic coating is plasma sprayed on to a Hastelloy X article which has previously been coated with a MCrAlY type metallic underlayer. The composition of the ceramic coating is as follows:

| | |
| --- | --- |
| $ZrO_2$ | base |
| $Dy_2O_3$ | 11.2 wt. % |

The raw sprayed coating is given a heat treatment in air at 1100° C. for 10 hours in order to stabilise the ceramic in a state representative of its use in operation (this treatment having the special feature of restoring the stoichiometry of the oxides present in the ceramic). After treatment the coating in accordance with the invention has a porosity level very close to that conventionally measured for a ceramic having the composition $ZrO_2+8$ wt. % $Y_2O_3$ prepared by the same process, namely approximately 8.5% porosity.

To assess the influence of the novel ceramic composition on the thermal conductivity of the ceramic coating as compared with a conventional ceramic composition consisting of $ZrO_2+8$ wt. % $Y_2O_3$ prepared by the same process a check was again made to ensure that the two coatings had the same microstructure.

The measured thermal conductivity of the $ZrO_2+11.2$ wt. % $Dy_2O_3$ coating is 0.81 W/m.K. at 1100° C., compared to 1.19 W/m.K. for the conventional ceramic coating. The novel ceramic composition described in this example therefore achieves a more than 30% improvement in the insulation provided by the ceramic.

The invention is not limited to the examples which have been particularly described above. The bonding underlayer may consist of some other alloy such as, for example, plain nickel aluminide or nickel aluminide modified by metals such as chromium, platinum, palladium, ruthenium, iridium, osmium and rhodium. Optionally, the zirconia may also contain between 0 and 30 mol. % of an oxide containing a quadrivalent metallic ion of greater atomic mass than the zirconium ions. For example, the oxide may be hafnium dioxide or cerium dioxide. Also, the coated article may be made of a superalloy other than Hastelloy X.

What is claimed is:

1. A low thermal conductivity heat barrier composition consisting essentially of zirconia and a dysprosium oxide.

2. The composition according to claim 1, wherein the proportion of dysprosium in the composition is between 2 and 30 wt. %.

3. A mechanical article comprising
   a superalloy, and
   a ceramic heat barrier coating on the superalloy, wherein the ceramic heat barrier coating includes the composition of claim 1.

4. The article according to claim 3, further comprising a bonding, underlayer sandwiched between the superalloy and the ceramic heat barrier coating.

5. The article according to claim 4, wherein the bonding underlayer consists of an alloy adapted to form a protective alumina layer by oxidation.

6. The article according to claim 5, wherein the bonding underlayer consists of a MCrAlY alloy in which M is a metal selected from the group consisting of nickel, cobalt, iron, and mixtures thereof.

7. The article according to claim 5, wherein the bonding underlayer consists of a member of the group consisting of nickel aluminide and an aluminide of nickel containing at least one metal selected from platinum, chromium, palladium, and ruthenium.

8. A method of making a heat barrier coating on a superalloy substrate, the method comprising the steps of:
   depositing a bonding underlayer on the superalloy substrate; and
   depositing on the underlayer a ceramic coating consisting essentially of zirconia and a dysprosium oxide.

9. The method according to claim 8, further comprising a step of oxidizing the bonding underlayer prior to the step of depositing the ceramic coating.

10. A low thermal conductivity heat barrier composition comprising zirconia, a dysprosium oxide, and hafnium dioxide.

11. The composition according to claim 10, wherein the proportion of dysprosium in the composition is between 2 and 30 wt. %.

12. The composition according to claim 10, wherein the hafnium dioxide is present in an amount up to 30 mol. %.

13. A mechanical article comprising
    a superalloy, and
    a ceramic heat barrier coating on the superalloy, wherein the ceramic heat barrier coating includes the composition of claim 10.

14. The article according to claim 13, further comprising a bonding underlayer sandwiched between the superalloy and the ceramic heat barrier coating.

15. The article according to claim 14, wherein the bonding underlayer consists of an alloy adapted to form a protective alumina layer by oxidation.

16. The article according to claim 15, wherein the bonding underlayer consists of a MCrAlY alloy in which M is a metal selected from the group consisting of nickel, cobalt, iron, and mixtures thereof.

17. The article according to claim 15, wherein the bonding underlayer consists of a member of the group consisting of nickel aluminide and an aluminide of nickel containing at least one metal selected from platinum, chromium, palladium, and ruthenium.

18. A method of making a heat barrier coating on a superalloy substrate, the method comprising the steps of:
    depositing a bonding underlayer on the superalloy substrate; and
    depositing on the underlayer a ceramic coating including the composition of claim 12.

19. The method according to claim 18, further comprising a step of oxidizing the bonding underlayer prior to the step of depositing the ceramic coating.

* * * * *

UNITED STATES PATENT AND TRADEMARK OFFICE
CERTIFICATE OF CORRECTION

PATENT NO. : 6,333,118 B1
DATED : December 25, 2001
INVENTOR(S) : Alperine et al.

Page 1 of 1

It is certified that error appears in the above-identified patent and that said Letters Patent is hereby corrected as shown below:

Column 3,
Line 3, "coatings arc porous ccramic layers" should read -- coatings are porous ceramic layers --

Column 5,
Line 44, "proosity" should read -- porosity --

Column 6,
Line 8, "Stabilishing" should read -- stabilizing --

Column 7,
Line 20, "Ilastelloy" should read -- Hastelloy --.

Signed and Sealed this

Twenty-third Day of April, 2002

Attest:

Attesting Officer

JAMES E. ROGAN
Director of the United States Patent and Trademark Office